US009442355B2

(12) United States Patent
Shinha et al.

(10) Patent No.: US 9,442,355 B2
(45) Date of Patent: Sep. 13, 2016

(54) PROJECTOR AND METHOD FOR CONTROLLING THE SAME

(71) Applicant: SEIKO EPSON CORPORATION, Tokyo (JP)

(72) Inventors: Hiroaki Shinha, Matsukawa-Mura (JP); Koichi Miyasaka, Matsumoto (JP); Hirofumi Kasuga, Matsumoto (JP); Tadashi Kinebuchi, Okaya (JP); Shuji Narimatsu, Suwa (JP); Kaoru Yamaguchi, Chino (JP); Hidehito Iisaka, Shiojiri (JP)

(73) Assignee: SEIKO EPSON CORPORATION, Tokyo (JP)

( * ) Notice: Subject to any disclaimer, the term of this patent is extended or adjusted under 35 U.S.C. 154(b) by 197 days.

(21) Appl. No.: 14/069,102

(22) Filed: Oct. 31, 2013

(65) Prior Publication Data
US 2014/0139811 A1    May 22, 2014

(30) Foreign Application Priority Data
Nov. 16, 2012    (JP) .................................. 2012-252014

(51) Int. Cl.
*G03B 21/20*    (2006.01)
*H04N 9/31*    (2006.01)
*G02B 5/02*    (2006.01)
*G03B 33/06*    (2006.01)

(52) U.S. Cl.
CPC ......... *G03B 21/2013* (2013.01); *G03B 21/204* (2013.01); *G03B 21/208* (2013.01); *G03B 33/06* (2013.01); *H04N 9/315* (2013.01); *G02B 5/0278* (2013.01); *G03B 21/206* (2013.01); *H04N 9/3155* (2013.01)

(58) Field of Classification Search
CPC .............. G03B 21/2013; G03B 21/20; G03B 21/2053; G03B 21/206; G03B 21/2093; G03B 21/28; G03B 21/26; H04N 9/315; H04N 9/3155; G02B 5/02; G02B 5/0273; G02B 5/0278
USPC .................................................... 353/82, 122
See application file for complete search history.

(56) References Cited

U.S. PATENT DOCUMENTS

2008/0036977 A1 *    2/2008    Sugita et al. ................... 353/82
2009/0015799 A1 *    1/2009    Luciano ......................... 353/79
2009/0310087 A1 *    12/2009    Itoh et al. ...................... 353/38

FOREIGN PATENT DOCUMENTS

| JP | 08163476 A | * | 6/1996 |
| JP | 2005-099588 A | | 4/2005 |
| JP | 2006-227143 A | | 8/2006 |
| JP | 2007-072322 A | | 3/2007 |
| JP | 2010-027586 A | | 2/2010 |
| JP | 2010027586 A | * | 2/2010 |

* cited by examiner

*Primary Examiner* — William C Dowling
*Assistant Examiner* — Ryan Howard
(74) *Attorney, Agent, or Firm* — Maschoff Brennan

(57) ABSTRACT

A projector includes a power receiving terminal, a light source that emits light based on electric power supplied to the power receiving terminal, a light diffuser that adjusts the degree of diffusion of the light from the light source, a specifying section that alternately specifies one of illumination projection and image projection every time electric power supply to the power receiving terminal is started, and a light diffusion controller that controls the light diffuser so that when the specifying section specifies the illumination projection, the light diffuser diffuses the light from the light source, whereas when the specifying section specifies the image projection, the light diffuser transmits the light without substantially diffusing the light.

14 Claims, 10 Drawing Sheets

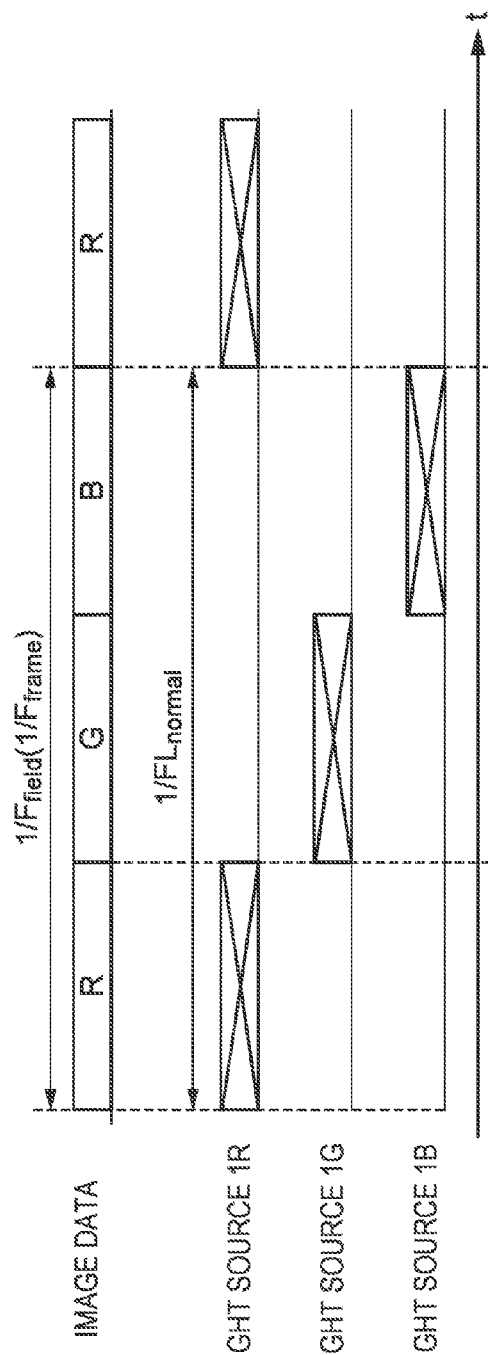
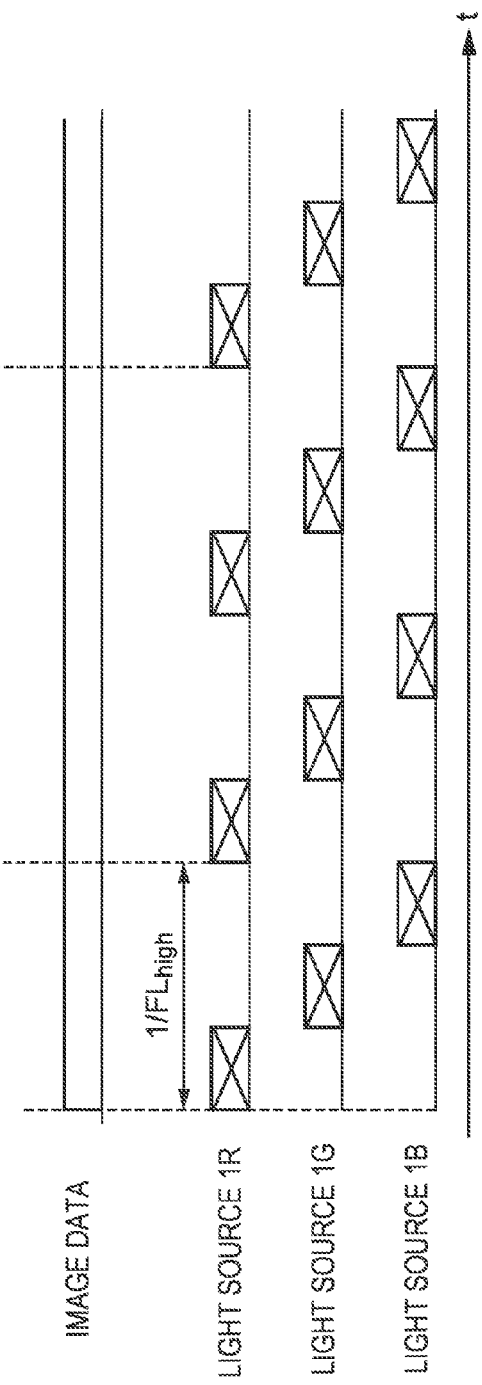
FIG. 4A
FIG. 4B

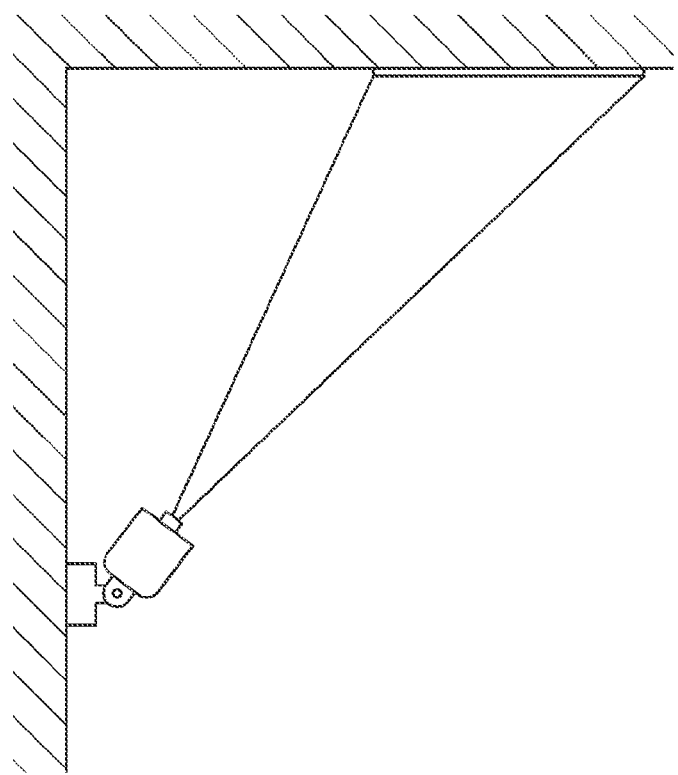
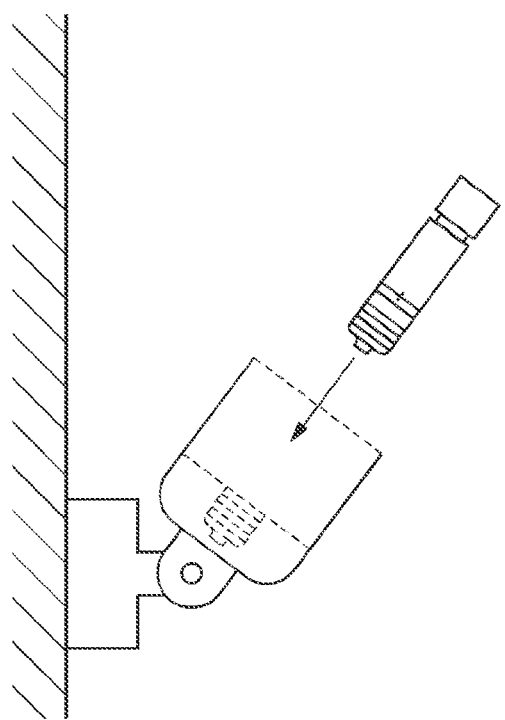
FIG. 10B
FIG. 10A

PROJECTOR AND METHOD FOR CONTROLLING THE SAME

The entire disclosure of Japanese Patent Application No. 2012-252014, filed Nov. 16, 2012 is expressly incorporated by reference herein.

BACKGROUND

1. Technical Field

The present invention relates to a projector with a function as an illuminator and a method for controlling the projector.

2. Related Art

There is a known projector that is fixed to a power feed terminal, such as a socket for an illuminator, and receives electric power supplied from the power feed terminal (FIGS. 10A and 10B, JP-A-2005-99588 and JP-A-2006-227143). Further, there is a known illumination apparatus using a light emitting diode as a light source and including a polymer dispersed liquid crystal light control shutter that diffuses light from the light emitting diode as required for light control (see JP-A-2010-27586). Moreover, there is a known image display apparatus having a mode in which a lamp in the display apparatus is directly turned on when AC electric power is inputted (see JP-A-2007-72322).

SUMMARY

A projector with a function as an illuminator may cause a user to think that the operation of the projector is cumbersome due to the function as an illuminator added to the projector. The patent documents described above, however, do not mention the problem.

An advantage of some aspects of the invention is to solve at least a part of the problems described above, and the invention can be implemented as the following aspects or application examples.

Application Example 1

According to an aspect of the invention, a projector includes a power receiving terminal, a light source that emits light based on electric power supplied to the power receiving terminal, a light diffuser that adjusts the degree of diffusion of the light from the light source, a specifying section that alternately specifies one of first projection and second projection every time electric power supply to the power receiving terminal is started, and a light diffusion controller that controls the light diffuser so that when the specifying section specifies the first projection, the light diffuser diffuses the light from the light source, whereas when the specifying section specifies the second projection, the light diffuser transmits the light without substantially diffusing the light.

Application Example 2

According to another aspect of the invention, the light diffuser includes a PDLC device.

Application Example 3

According to another aspect of the invention, the light diffuser includes a focus adjustment lens.

Application Example 4

According to another aspect of the invention, a method for controlling a projector including a power receiving terminal, a light source that emits light based on electric power supplied to the power receiving terminal, and a light diffuser that adjusts the degree of diffusion of the light from the light source includes a step A of alternately specifying one of first projection and second projection every time electric power supply to the power receiving terminal is started, a step B of causing the light diffuser to diffuse the light from the light source when the first projection is specified in the step A; and a step C of causing the light diffuser to transmit the light without substantially diffusing the light when the second projection is specified in the step A.

According to the configuration described above, in which one of the first projection and the second projection is alternately specified every time electric power supply to the power reception terminal is started, when the first projection is specified, the light from the light source is diffused. Repeating supplying electric power to the power receiving terminal and stopping supplying the electric power therefore allows the projector to selectively perform the function as an illuminator.

Application Example 5

According to another aspect of the invention, a projector includes a light source, a light diffuser that adjusts the degree of diffusion of light from the light source, a display controller that reproduces a content, a spatial light modulator that modulates the light from the light source in accordance with the reproduction of the content, and a light diffusion controller that controls the light diffuser so that when the display controller reproduces the content, the light diffuser transmits the light from the light source without substantially diffusing the light, and the light diffusion controller controls the light diffuser so that when the reproduction of the content is completed, the light diffuser diffuses the light from the light source.

Application Example 6

According to another aspect of the invention, the light diffuser includes a PDLC device.

Application Example 7

According to another aspect of the invention, the light diffuser includes a focus adjustment lens.

Application Example 8

According to another aspect of the invention, a method for controlling a projector including a light source, a light diffuser that adjusts the degree of diffusion of light from the light source, a display controller that reproduces a content, and a spatial light modulator that modulates the light from the light source in accordance with the reproduction of the content includes a step A of causing the display controller to reproduce the content, a step B of controlling the light diffuser so that when the display controller reproduces the content, the light diffuser transmits the light from the light source without substantially diffusing the light, and a step C of controlling the light diffuser so that when the reproduction of the content is completed, the light diffuser diffuses the light from the light source.

According to the configuration described above, when reproduction of a content is completed, the light from the light source is diffused. The projector can therefore be so configured that it starts performing the function as an illuminator when reproduction of a content is completed.

Application Example 9

According to another aspect of the invention, a projector includes a light source, a light diffuser that adjusts the degree of diffusion of light from the light source, an interface that receives a predetermined trigger, a display controller that reproduces a content when the interface has received the trigger within a predetermined period since the interface stared waiting for the trigger, a spatial light modulator that modulates the light from the light source in accordance with the reproduction of the content, and a light diffusion controller that controls the light diffuser so that when the display controller reproduces the content, the light diffuser transmits the light from the light source without substantially diffusing the light, and the light diffusion controller controls the light diffuser so that when the interface has not received the trigger within the predetermined period, the light diffuser diffuses the light from the light source.

Application Example 10

According to another aspect of the invention, the trigger is a command that instructs reproduction of the content.

Application Example 11

According to another aspect of the invention, the trigger is the content to be reproduced.

Application Example 12

According to another aspect of the invention, the light diffuser includes a PDLC device.

Application Example 13

According to another aspect of the invention, the light diffuser includes a focus adjustment lens.

Application Example 14

According to another aspect of the invention, a method for controlling a projector including a light source, a light diffuser that adjusts the degree of diffusion of light from the light source, an interface that receives a predetermined trigger, a display controller that reproduces a content, and a spatial light modulator that modulates the light from the light source in accordance with the reproduction of the content includes a step A of causing the interface to start waiting for the trigger, a step B of causing the display controller to reproduce the content when the interface has received the trigger within a predetermined period since the interface started waiting for the trigger, a step C of controlling the light diffuser so that when the display controller reproduces the content, the light diffuser transmits the light from the light source without substantially diffusing the light, and a step D of controlling the light diffuser so that when the interface has not received the trigger within the predetermined period, the light diffuser diffuses the light from the light source.

According to the configuration described above, when the interface has not received a predetermined trigger within a predetermined period, the light from the light source is diffused. The projector can therefore be so configured that it starts performing the function as an illuminator when the interface has not received the predetermined trigger within the predetermined period. The predetermined trigger is, for example, a command input that instructs reproduction of a content, operation of pressing a button on an enclosure to instruct reproduction of a content, or an external input of a content itself.

BRIEF DESCRIPTION OF THE DRAWINGS

The invention will be described with reference to the accompanying drawings, wherein like numbers reference like elements.

FIGS. 4A and 4B show timing charts for describing a method for driving a light source in the projector according to the embodiment, in which FIG. 4A shows a normal mode and FIG. 4B shows a high-speed mode.

FIGS. 10A and 10B show a projector attached to a power feed terminal for an illuminator.

DESCRIPTION OF EXEMPLARY EMBODIMENTS

First Embodiment

1. Configuration of Projector

Figure 1:
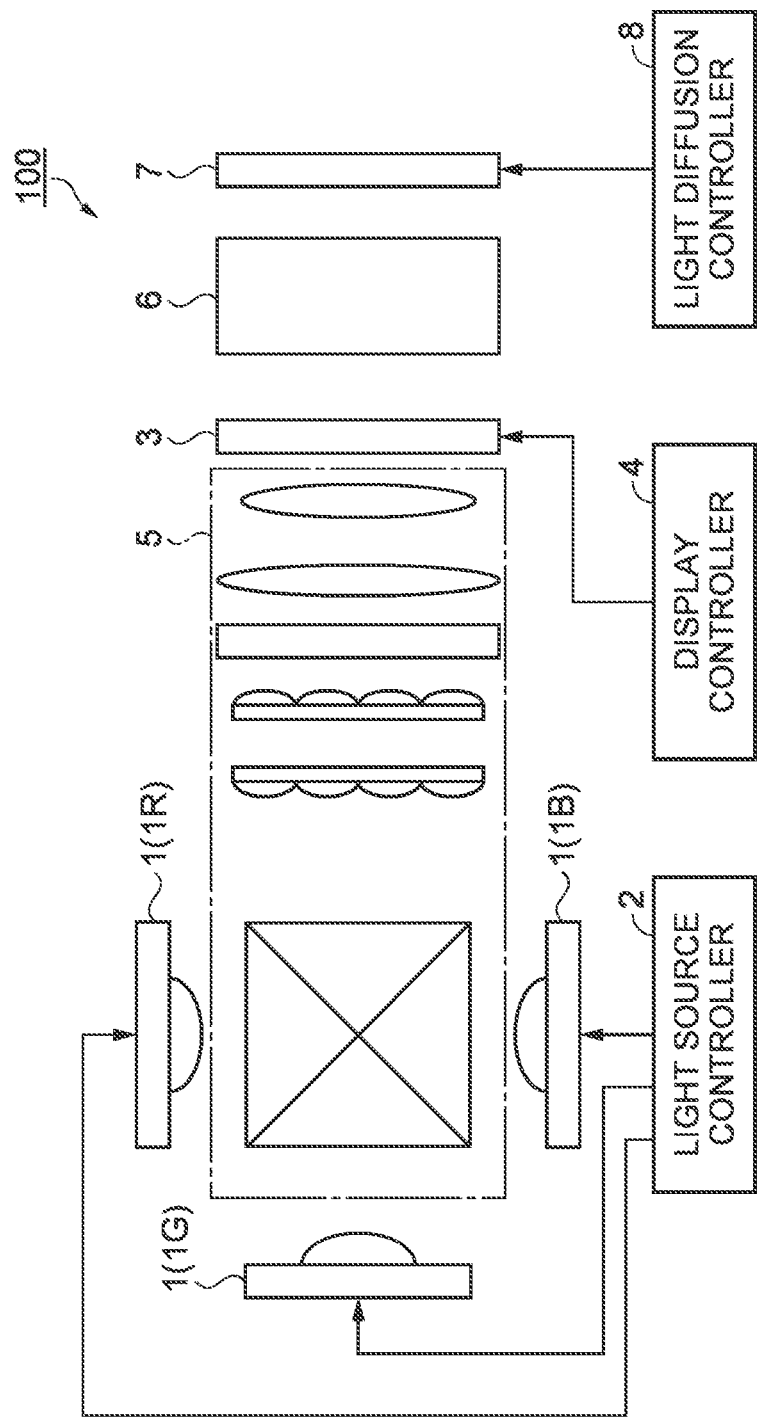
FIG. 1 is a schematic view of a projector according to an embodiment.

A projector 100 includes a light source 1, a light source controller 2, which drives the light source 1, a spatial light modulator 3, which modulates light from the light source 1, a display controller 4, which writes an image to the spatial light modulator 3, an irradiation system 5, which is so provided that the spatial light modulator 3 is irradiated with the light from the light source 1, a projection system 6, which projects the light modulated by the spatial light modulator 3, a light diffuser 7, which adjusts the degree of diffusion of the light from the projection system 6, and a light diffusion controller 8, which controls the light diffuser 7, as shown in FIG. 1.

Figure 2:
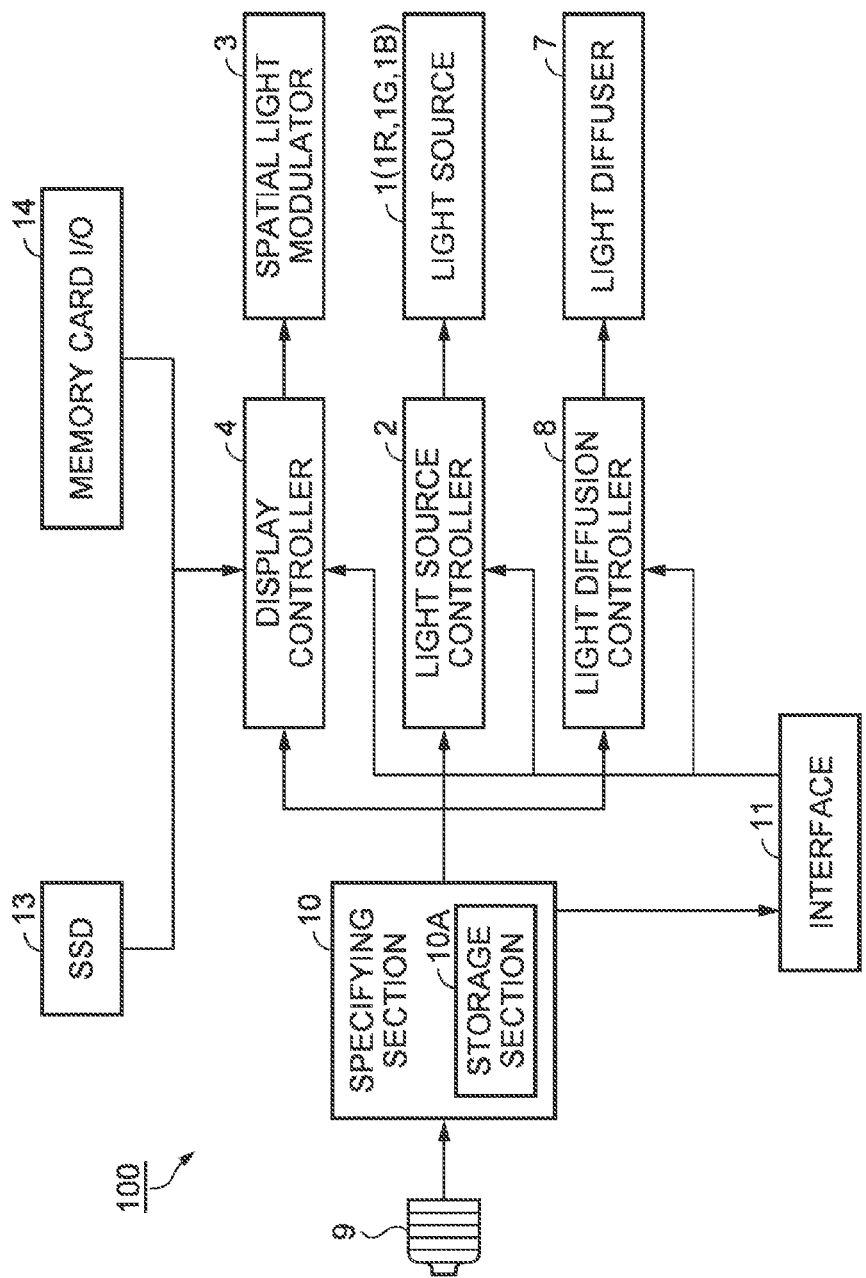
FIG. 2 is a functional block diagram of the projector according to the embodiment.

The projector 100 further includes a power receiving terminal 9, which receives electric power that allows the projector 100 to function from an external power source via a power feed terminal (not shown), and a specifying section 10, as shown in FIG. 2. The electric power supplied to the power receiving terminal 9 may be AC or DC electric power.

The projector 100 further includes an interface 11. The interface 11 includes a wireless LAN adapter 12 (FIG. 5), which is a kind of a communication section. The interface 11 further includes an IR reception circuit 27 (FIG. 5), which receives a command from a remote controller used by a user.

The function of the interface 11 allows the projector 100 to receive a command to the projector 100 over an external network (not shown). The function of the interface 11 further allows the projector 100 to project an image stored in a storage section of an external server computer, personal computer, smartphone, or tablet computer (not shown).

The projector 100 further includes an SSD (solid state drive) 13, which includes a flash drive, and a memory card I/O (input/output) circuit (including card slot) 14. The SSD 13 or a memory card (not shown) inserted into the card slot stores images to be projected by the projector 100. Stored images can be rewritten via the external network by using the function of the interface 11.

In the present specification, the term "image(s)" is defined so as to mean a still image(s) or motion image(s). The image(s) includes those that changes with time, such as slideshow images, and may be accompanied by audio. Further, "image(s)" means a still or motion image(s) itself to be displayed or projected in some cases or means data based on which a still or motion image(s) is displayed/projected (including streaming data) in other cases.

The light source 1 includes an LED corresponding to R (red light), an LED corresponding to G (green light), and an LED corresponding to B (blue light) and is also referred to as an RGB light sources 1R, 1G, and 1B in the following sections. R, G, and B are an example of a combination of typical element colors for full-color display. The light source 1 in the present embodiment therefore includes three LEDs corresponding to the three different element colors. The light source 1 in other embodiments, however, may include LEDs corresponding to four or more different element colors or LEDs corresponding to two different element colors. Further, the light source 1 may include organic or inorganic semiconductor lasers or organic EL (electroluminescent) devices instead of LEDs or may include fluorophores excited by LED or laser light sources.

The irradiation system 5 includes a dichroic prism that combines optical paths of light fluxes (light beams) from the RGB light sources 1R, 1G, and 1B, an integrator that includes fly's eye lenses, and a polarization conversion element that aligns the polarization directions of light fluxes from the integrator with each other.

The spatial light modulator 3 in the present embodiment is a single-plate transmissive liquid crystal light valve. The liquid crystal light valve in the present embodiment includes a pair of polarizers and a liquid crystal panel interposed therebetween. The RGB light sources 1R, 1G, and 1B and the spatial light modulator 3 are driven based on an RGB sequential method, that is, a color sequential method, as will be described later in detail. The projector 100 can thus perform full-color illumination or full-color image projection.

The light diffuser 7 is disposed in the optical path of the light projected through the projection system 6. The light diffuser 7 includes a transmissive, reverse-mode PDLC device. PDLC means a polymer-dispersed liquid crystal material. Although not shown, the reverse-mode PDLC device includes a pair of light transmissive electrodes and a reverse-mode PDLC layer interposed between the pair of electrodes.

When no electric potential difference is applied between the pair of electrodes, the reverse-mode PDLC layer transmits light. As a result, light incident on the light diffuser 7 passes through the light diffuser 7 without undergoing substantial diffusion. The light diffuser 7 in this state is expressed as operating in a non-diffusion state.

On the other hand, when a predetermined electric potential difference is applied between the pair of electrodes, the reverse-mode PDLC layer diffuses light incident thereon. As a result, the light is diffused and passes through the light diffuser 7. The light diffuser 7 in this state is expressed as operating in a diffusion state.

Further, when the potential difference applied between the pair of electrodes is an intermediate value between zero and the predetermined potential difference, the reverse-mode PDLC layer provides an intermediate degree of light diffusion according to the potential. As a result, light incident on the light diffuser 7 is diffused moderately and passes through the light diffuser 7. The light diffuser 7 in this state is expressed as operating in an intermediate diffusion state.

As described above, the light diffuser 7 can adjust the degree of diffusion of an image or illumination light projected from the projector 100.

The transparency of the reverse-mode PDLC layer operating in the light transmission mode is higher than the transparency of a typical PDLC layer operating in the light transmission mode. This is an advantage of the light diffuser 7 including the reverse-mode PDLC layer (or reverse-mode PDLC device). The definition of the term "PDLC" includes both "reverse-mode PDLC" and typical "PDLC."

The power receiving terminal 9 in the present embodiment is a base used with a light bulb. That is, the power receiving terminal 9 has a structure that is screwed into and fixed to a light bulb base socket that is an example of the power feed terminal for an illuminator and receives electric power supplied from the light bulb base socket. The power receiving terminal 9 is not necessarily a plug connected to a power feed terminal for an illuminator and may instead be a plug connected to an outlet as a typical power feed terminal. In this case, the projector 100 may include a cord that electrically connects the plug, which is the power receiving terminal 9, to a main body of the projector 100.

The specifying section 10 includes a storage section 10A, which is a nonvolatile memory. The specifying section 10 detects that electric power supply to the power receiving terminal 9 is started. The specifying section 10 alternately specifies one of first projection and second projection every time electric power supply to the power receiving terminal 9 is started. The projector 100 activates and deactivates its function as an illuminator in accordance with the specifying operation. In the present embodiment, the first projection is "illumination projection," and the second projection is "image projection." The definition of the "illumination projection" and the definition of the "image projection" will be described in a later section (5. "Illumination projection" and "image projection").

2. Function of Projector

The function of the projector 100 will be summarized below.

For example, the user turns a switch (not shown) that supplies a power feed terminal (not shown) with electric power from an open state (OFF) to a closed state (ON) at a certain timing. Electric power supply from the power feed terminal to the power receiving terminal 9 is then started. As a result, the projector 100 starts illumination projection.

The user then turns the switch from the closed state (ON) to the open state (OFF). No electric power is then supplied to the power receiving terminal 9. As a result, the projector 100 stops the projection.

The user then turns the switch from the open state (OFF) to the closed state (ON). Electric power supply from the power feed terminal to the power receiving terminal 9 is then started. As a result, the projector 100 starts image projection.

The user then turns the switch from the closed state (ON) to the open state (OFF). No electric power is then supplied to the power receiving terminal 9. As a result, the projector 100 stops the projection.

The user then turns the switch from the open state (OFF) to the closed state (ON). Electric power supply from the power feed terminal to the power receiving terminal 9 is then started. As a result, the projector 100 starts illumination projection again.

The above function of the projector 100 will be described in more detail with reference to FIG. 3.

Figure 3:
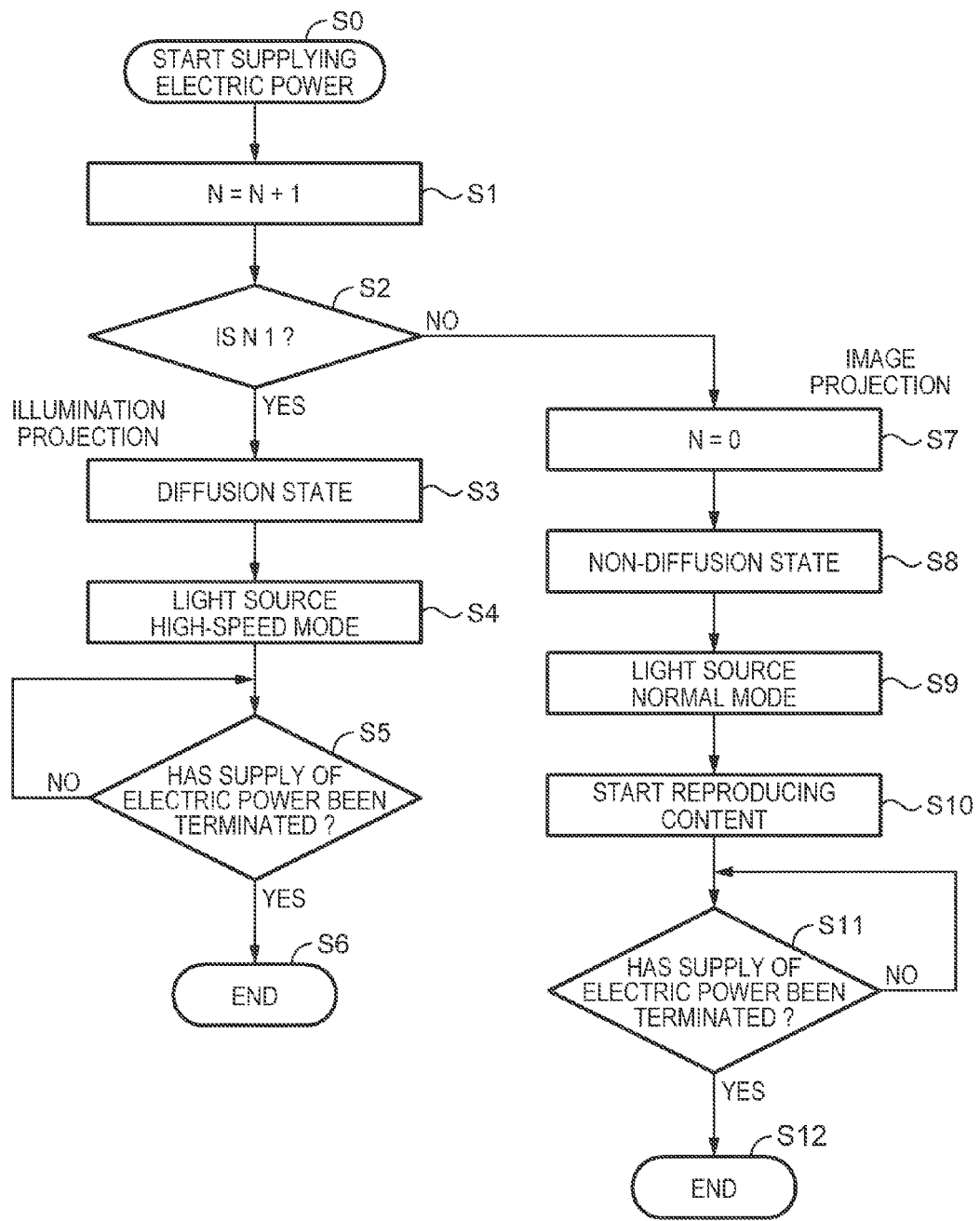
FIG. 3 is a flowchart showing the operation of the projector according to the embodiment.

The user turns the switch (not shown), which supplies the power feed terminal (not shown) with electric power, from the open state (OFF) to the closed state (ON) at a certain timing, as shown in FIG. 3. Electric power supply from the power feed terminal to the power receiving terminal 9 is then started (S0). That is, main electric power supply to the projector 100 is started. The phrase "electric power or main electric power supply is started" means in the present embodiment that the voltage of the electric power supplied to the power receiving terminal 9 changes from zero voltage to a voltage necessary for the projector 100 to perform the illumination or image projection, whereas the phrase may mean in other embodiments that the voltage of the supplied electric power changes from a voltage insufficient for the projector 100 to perform the illumination or image projection to the necessary voltage described above.

After electric power supply to the power receiving terminal 9 is started, the specifying section 10 is activated. The specifying section 10 reads the value of N stored in the storage section 10A (nonvolatile memory) and increments the read value of N (adds "1" to original value) (S1). For example, when the stored value of N is "0", the value of N becomes "1" in step S1. "N" is an integer-type variable but is not limited thereto. In step S1, the incremented value of N is stored in the storage section 10A.

In the present embodiment, N having a value of "1" means the "illumination projection," whereas N having a value other than "1" means the "image projection," as will be described below. The definition of the "illumination projection" and the definition of the "image projection" will be described in a later section (5. "Illumination projection" and "image projection").

The specifying section 10 then determines whether or not the value of N is "1" (S2). When the value of N is "1", the light diffusion controller 8 controls the light diffuser 7 in such a way that the light diffuser 7 operates in the diffusion state (S3). In the present embodiment, in which the light diffuser 7 includes the reverse-mode PDLC layer, the predetermined potential difference is applied between the pair of electrodes, which sandwich the reverse-mode PDLC layer. When the light diffuser 7 includes a typical PDLC layer, the light diffusion controller 8 controls the light diffuser 7 in such a way that no potential difference is applied between the pair of electrodes (in this process, no action may be done, for example). The reason for this is that the reverse-mode PDLC layer operates in the diffusion state when a potential difference is present and in the non-diffusion state when no potential difference is present, whereas a typical PDLC layer operates conversely.

When the value of N is "1" (S2: YES), the light source controller 2 causes the RGB light sources 1R, 1G, and 1B to start emitting light fluxes. At this point, the light source controller 2 drives the RGB light sources 1R, 1G, and 1B in a "high-speed mode" (S4) that will be described later. It is noted that a trigger in response to which the light source controller 2 causes the RGB light sources 1R, 1G, and 1B to start emitting light fluxes may be the determination described above made by the specifying section 10 or initiation of another step following the determination described above. The same holds true for initiation of operation of the light diffusion controller 8 and initiation of operation of the display controller 4.

The light source 1 may start emitting light before or after the light diffuser 7 starts diffusing light, or they may start operating at the same time.

When the value of N is "1", the display controller 4 may start reproducing (playing) a content for illumination projection, although not shown. In this case, specifically, the display controller 4 starts writing an image for illumination projection to the spatial light modulator 3. The image for illumination projection typically has uniform luminance over the image. The image for illumination projection may instead be an image in which the luminance at the periphery is lower or higher than the luminance at the center. The image for illumination projection is stored in a nonvolatile memory or a ROM in a control section 23, which will be described later with reference to FIG. 5, or may be stored in the SSD 13, the memory card, or a storage device on a network. The spatial light modulator 3 modulates light fluxes from the RGB light sources 1R, 1G, and 1B in accordance with the written image. It is, however, noted that when the spatial light modulator 3 includes a normally-white (parallel-Nicol) liquid crystal light valve, in which case the spatial light modulator 3 transmits light uniformly even when no image is written, the display controller 4 may write no image to the spatial light modulator 3. The step of reproducing a content for illumination projection may therefore be omitted.

After the steps described above are carried out, the light fluxes from the RGB light sources 1R, 1G, and 1B pass through the spatial light modulator 3 and the projection system 6 and are diffused by the light diffuser 7. As a result, the projector 100 performs illumination projection. Although an expression of illumination "projection" is used for convenience, the RGB light sources 1R, 1G, and 1B, the light fluxes from which are diffused by the light diffuser 7, can provide soft light suitable for illumination of a room or any other similar place. The projector 100 can therefore be used as an illuminator.

The projector 100 then enters a state in which it waits for termination of the electric power supplied to the power receiving terminal 9 while performing illumination projection (S5: NO). When the electric power supplied to the power receiving terminal 9 is terminated (S5: YES), the projector 100 stops operating (S6).

When the value of N is not "1" (S2: NO), the specifying section 10 sets the value of N at "0" (S7). The value of N set at "0" is stored in the storage section 10A.

When the value of N is not "1" (S2: NO), the light diffusion controller 8 controls the light diffuser 7 in such a way that the light diffuser 7 operates in the non-diffusion mode (S8), which means in the present embodiment that the predetermined potential difference is not applied between the pair of electrodes, which sandwich the reverse-mode PDLC layer. When the light diffuser 7 includes a typical PDLC layer, the light diffusion controller 8 controls the light diffuser 7 in such a way that a potential difference is applied between the pair of electrodes. The light source controller 2 then causes the RGB light sources 1R, 1G, and 1B to start emitting light fluxes. At this point, the light source controller 2 drives the RGB light sources 1R, 1G, and 1B in a "normal mode" (S9) that will be described later. Since the light diffuser 7 operates in the non-diffusion mode, the light fluxes from the RGB light sources 1R, 1G, and 1B pass through the light diffuser 7 without undergoing substantial diffusion. It is noted that the light source 1 may start emitting light before or after the light diffuser 7 stops substantially diffusing light, or they may operate at the same time.

Further, when the value of N is not "1" (S2: NO), the display controller 4 starts reproducing a content for image projection (S10). Specifically, the display controller 4 starts writing an image for image projection to the spatial light modulator 3.

After the processes described above are carried out, the light fluxes from the RGB light sources 1R, 1G, and 1B are modulated in accordance with the image written to the spatial light modulator 3 and projected through the projection system 6. Since the light diffuser 7 operates in the non-diffusion state, the light fluxes modulated by the spatial light modulator 3 pass through the light diffuser 7 without undergoing substantial diffusion. As a result, a clear and/or bright image is projected. Effective images projected in this process include not only a computer screen that provides information but also an image, photograph, or any other form of a picture. Further, software corresponding to an API (application program interface) provided in a photograph sharing site on the Internet can be implemented in the control section 23 (FIG. 5) in the projector 100, and only a photograph to which specific attribute information (use permission, for example) is imparted in the site can be automatically selected and projected.

The projector 100 then enters a state in which it waits for termination of the electric power supplied to the power receiving terminal 9 while performing image projection (S11: NO). When the electric power supplied to the power receiving terminal 9 is terminated (S11: YES), the projector 100 stops the projection (S12).

In the configuration described above, repeating initiation (starting) and termination (stopping) of supplying the power receiving terminal 9 with electric power allows the projector 100 to selectively perform the function as an illuminator. Initiation (starting) and termination (stopping) of supplying the power receiving terminal 9 with electric power can be performed, for example, by the user who repeatedly turns on and off the switch that supplies the power feed terminal with electric power in some cases, whereby the projector 100 provides excellent convenience.

3. Drive Mode of RGB Light Sources

A method for driving the RGB light sources 1R, 1G, and 1B will next be described.

3.1 Normal Mode

In the RGB sequential driving, that is, color sequential driving, a single full-color frame is expressed by three temporally consecutive field images, as shown in FIG. 4A. When double-speed driving is not used and a frame frequency $F_{frame}$ at which a source image is switched to another is 60 Hz, a repetition frequency $F_{field}$ at which each RGB field image is repeated is 60 Hz. Further, when triple-speed driving is used, for example, and the frame frequency $F_{frame}$ at which a source image is switched to another is 60 Hz, the repetition frequency $F_{field}$ at which each RGB field image is repeated is 180 Hz. When the RGB light sources 1R, 1G, and 1B are driven in the normal mode, the RGB LEDs are sequentially and repeatedly driven in correspondence with RGB field images, and a repetition frequency $FL_{normal}$ at which each of the RGB light sources 1R, 1G, and 1B is repeated is 60 Hz (180 Hz in triple-speed driving). That is, in the normal mode, the repetition frequency $F_{field}$ at which each RGB field image is repeated is equal to the repetition frequency $FL_{normal}$ at which each of the sequentially driven RGB light sources 1R, 1G, and 1B is repeated. The number of element colors and the number of element light sources may be greater than three.

3.2 High-Speed Mode

The repetition frequency $FL_{high}$ at which each of the RGB light sources 1R, 1G, and 1B is repeated in the high-speed mode is higher than the repetition frequency $F_{field}$ at which each RGB field image is repeatedly written to the spatial light modulator 3 in the normal mode, as shown in FIG. 4B.

When the normal mode and the high-speed mode are defined, the two modes may, of course, be expressed by the ratio between the repetition frequencies $FL_{normal}$ and $FL_{high}$ in the two modes at which each of the RGB light sources 1R, 1G, and 1B is repeated. The repetition frequency $FL_{high}$ in the high-speed mode is higher than the repetition frequency $FL_{normal}$ in the normal mode and three times higher than the repetition frequency $FL_{normal}$ in the normal mode in the present embodiment.

In the present embodiment, when the projector 100 performs the illumination projection, in which the RGB light sources 1R, 1G, and 1B are driven in the high-speed mode, color breaking is less likely to be perceived than in the image projection. Further, in the illumination projection, in which the periods during which the RGB LEDs can emit light (light emittable periods) do not overlap with each other, it is not necessary to redundantly provide the same circuit in a light source drive circuit 25 (FIG. 5), whereby the circuit configuration can be simplified. Further, since the illumination projection is performed based on the RGB sequential driving as in the case of the image projection, the drive control can be simplified. That is, the projector 100 that also functions as an illuminator can be provided without an increase in cost.

In FIG. 4B, an image (image data) for illumination projection is written to the spatial light modulator 3 in synchronization with the high-speed-mode driving of the RGB light sources 1R, 1G, and 1B. The image, for example, has a uniform luminance distribution. Further, the written image is not necessarily refreshed in particular in the spatial light modulator 3 as shown in FIG. 4B but may be refreshed as desired. When refreshed, the written image may be accompanied by a change with time in the luminance distribution of the image. The image is preferably refreshed in synchronization with the end of one of the light emittable periods of the RGB light sources 1R, 1G, and 1B because the thus set refresh timing tends to prevent visual beats from occurring. The refresh frequency is preferably low from the viewpoint of reduction in power consumption. To this end, for example, it is conceivable to refresh the written image at a frequency lower than the repetition frequency at which each of the RGB light sources 1R, 1G, and 1B is repeated.

However, when the spatial light modulator 3 includes a normally-white (parallel-Nicol) liquid crystal light valve, in which case each pixel area of the spatial light modulator 3 transmits light even when no image (image data) is written, the display controller 4 may write no image to the spatial light modulator 3 when the RGB light sources 1R, 1G, and 1B are driven in the high-speed mode.

The color of projected light in the high-speed mode can be changed by changing the ratio among the intensities of the light fluxes emitted from the RGB light sources 1R, 1G, and 1B. The color of the light can also be changed by changing the pulse width (width of light emission period) in the light emittable period of each of the RGB light sources 1R, 1G, and 1B.

4. Hardware Configuration

Figure 5:
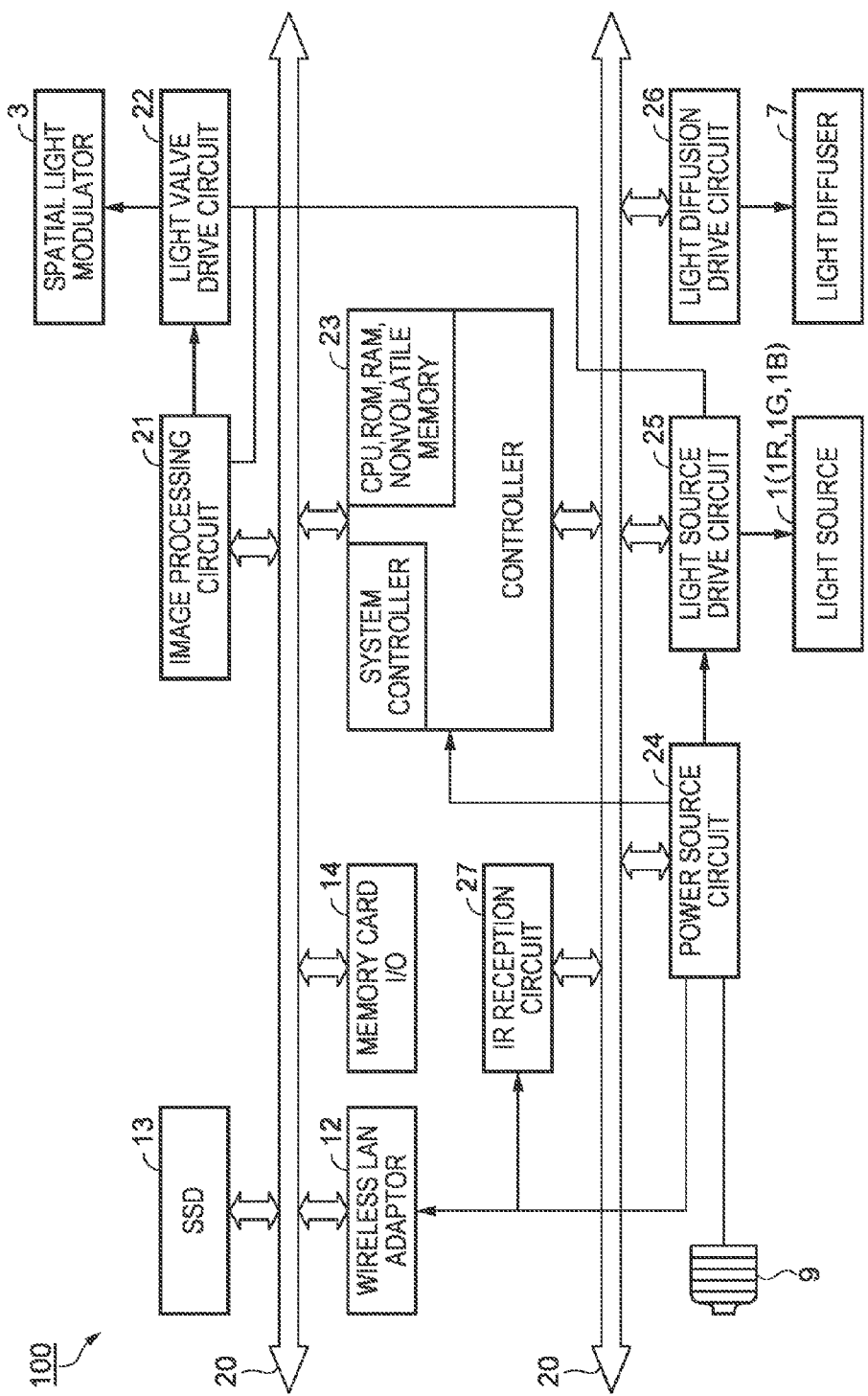
FIG. 5 is a schematic view showing the hardware configuration of the projector according to the embodiment.

The projector 100 will be described from the viewpoint of a more specific hardware configuration with reference to FIG. 5. It is, however, noted that the components described above have the same reference characters in FIG. 5 and no description thereof is made in some cases.

The projector 100 includes a bus 20, an image processing circuit 21, which performs resolution conversion and further performs color correction and trapezoidal correction on a source image, a light valve drive circuit 22, which provides the spatial light modulator 3 with a drive signal based on the image processed by the image processing circuit 21, a control section 23, a power source circuit 24, which is electrically connected to the power receiving terminal 9, a light source drive circuit 25, which provides the RGB light sources 1R, 1G, and 1B with drive signals, a light diffusion drive circuit 26, which provides the light diffuser 7 with a drive signal, and an IR reception circuit 27, which receives an infrared command from the remote controller. The components described above can communicate with each other via the bus 20 under the control of the control section 23.

The control section 23 includes a system controller, a nonvolatile memory including a flash memory, a ROM, a RAM, and a CPU. The nonvolatile memory stores operating software and application software for achieving the function described in the present embodiment, and the ROM stores a BIOS. The nonvolatile memory or the ROM further stores an image for illumination projection.

The specifying section 10 described above is embodied by the control section 23 and the power source circuit 24. The specifying section 10 is not necessarily configured this way and may be embodied by dedicated hardware including a flip-flop circuit.

The light source controller 2 is embodied by the control section 23 and the light source drive circuit 25. The display controller 4 is embodied by the control section 23, the image processing circuit 21, and the light valve drive circuit 22. The light diffusion controller 8 is embodied by the control section 23 and the light diffusion drive circuit 26. The interface 11 is embodied by the control section 23 and at least one of the IR reception circuit 27, the wireless LAN adapter 12, and buttons (not shown) on an enclosure. The configuration of each of the specifying section 10, the light source controller 2, the display controller 4, the light diffusion controller 8, and the interface 11 is not limited to the hardware configuration according to the present embodiment and can be any other equivalent configuration that provides the same function. Each of the components described above can alternatively be embodied by dedicated hardware.

5. "Illumination Projection" and "Image Projection"

"Illumination projection" in the broadest definition refers to a state in which the projector 100 serves as an illuminator and performs a function of providing a "light" in an indoor/in-room or outdoor environment. For example, "illumination projection" refers to a state in which the projector 100 projects an image for illumination projection on a projection surface. "Illumination projection" may be defined as a state in which the light diffuser 7 operates in the diffusion state. "Illumination projection" may instead be defined as a state in which the RGB light sources 1R, 1G, and 1B are driven in the high-speed mode. "Illumination projection" only needs to be a state in which at least one of the three conditions described above is satisfied. Therefore, in some cases, even when the projector 100 projects a picture, photograph, motion-picture, or computer screen, it can be said that the projector 100 performs "illumination projection" as long as the light diffuser 7 operates in the diffusion state or the RGB light sources 1R, 1G, and 1B are driven in the high-speed mode.

"Image projection" in the broadest definition refers to a state in which the projector 100 projects any kind of image. "Image projection" may be defined as a state in which the light diffuser 7 operates in the non-diffusion state. "Image projection" may instead be defined as a state in which the RGB light sources 1R, 1G, and 1B are driven in the normal mode. The state in which the light diffuser 7 operates in the intermediate diffusion state may be one of the states of "image projection."

Second Embodiment

A projector 100 according to a second embodiment differs from the projector 100 according to the first embodiment in that the projector 100 starts performing the function as an illuminator when reproduction of a content is completed. The projector 100 according to a second embodiment is otherwise basically the same as the projector 100 according to the first embodiment. Configurations and functions unique to the second embodiment will therefore be described below for the purpose of avoiding a redundant description.

Figure 6:
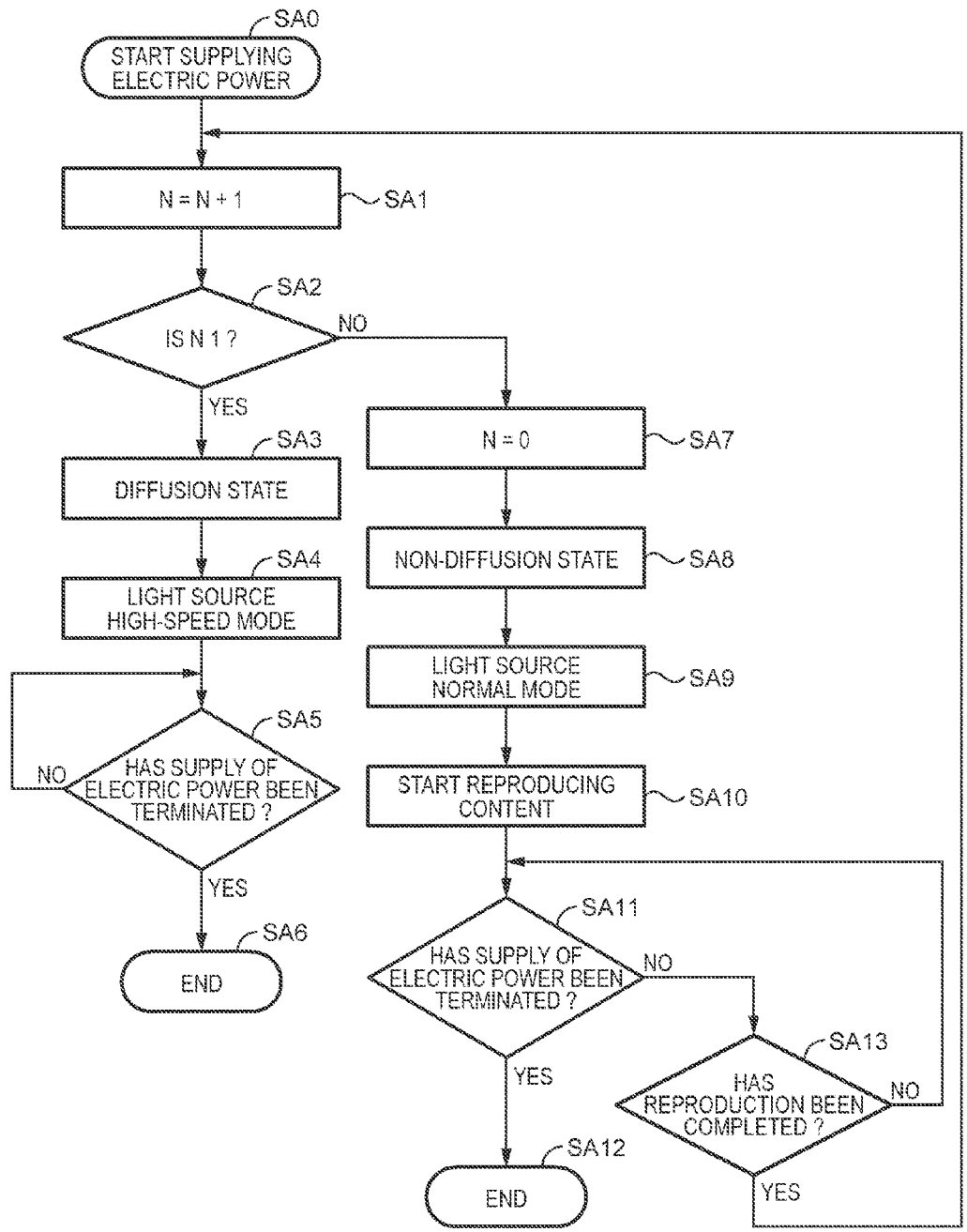
FIG. 6 is a flowchart showing the operation of a projector according to another embodiment.

In FIG. 6, steps SA0 to SA12 are basically the same as steps S0 to S12 (FIG. 3) respectively in the first embodiment.

In step SA10, the display controller 4 starts reproducing a content, as shown in FIG. 6. The projector 100 then enters a state in which it waits for termination of the electric power supplied to the power receiving terminal 9 while projecting images based on the content (SA11: NO). However, when the control section 23 (FIG. 5) determines that the reproduction of the content that had started in step SA10 has been completed before the supply of the electric power is terminated (SA13: YES), the control proceeds to a point immediately before step SA1. At this point, since the value of N has been set at "0" in step SA7, the value of N becomes "1" in step SA1, and the control therefore proceeds via the YES route from step SA2 to steps SA3, SA4, and SA5. As a result, the function of the projector 100 changes from the function of image projection to the function of illumination projection.

The timing at which the control proceeds to a point immediately before step SA1 occurs after the reproduction of the content is completed. That is, the control proceeding timing may occur after the reproduction of the content is completed or may occur when no content reproduction instruction is issued or no external content input is received within a predetermined period after the completion of the reproduction of the content.

The completion of the reproduction of the content corresponds, for example, to completion of reproduction of a content stored in the flash drive, the memory card, or the nonvolatile memory in the projector 100, completion of reception of a content externally received via the interface 11 and concurrently reproduced, and pressing a button for stopping content reproduction (stop button, for example) on the enclosure.

When reproduction of a content is completed in the configuration described above, the projector 100 starts performing the function as an illuminator. The present embodiment can therefore provide a projector that provides excellent convenience.

As a variation of the present embodiment, unlike the first embodiment, the function of alternately specifying one of the illumination projection and the image projection every time electric power supply to the power receiving terminal 9 is started may be omitted. Even when the function is omitted, the advantageous effect described above is provided.

The projector 100 can, for example, be so configured that the projector 100, after it is activated, projects a UI image for allowing the user to select which of a plurality of contents is reproduced. The projector 100 may also be so configured that when reproduction of the content selected based on the UI image is completed, the projector 100 starts performing the function as an illuminator. The variation also provides a projector that provides excellent convenience.

Third Embodiment

A projector 100 according to a third embodiment differs from the projector 100 according to the second embodiment in that the projector 100 according to the third embodiment can enter a state in which it waits for a predetermined trigger input and that when the predetermined trigger is not inputted within a predetermined period, the projector 100 according to the third embodiment starts performing the function as an illuminator. The projector 100 according to the third embodiment is otherwise basically the same as the projector 100 according to the second embodiment.

Figure 7:
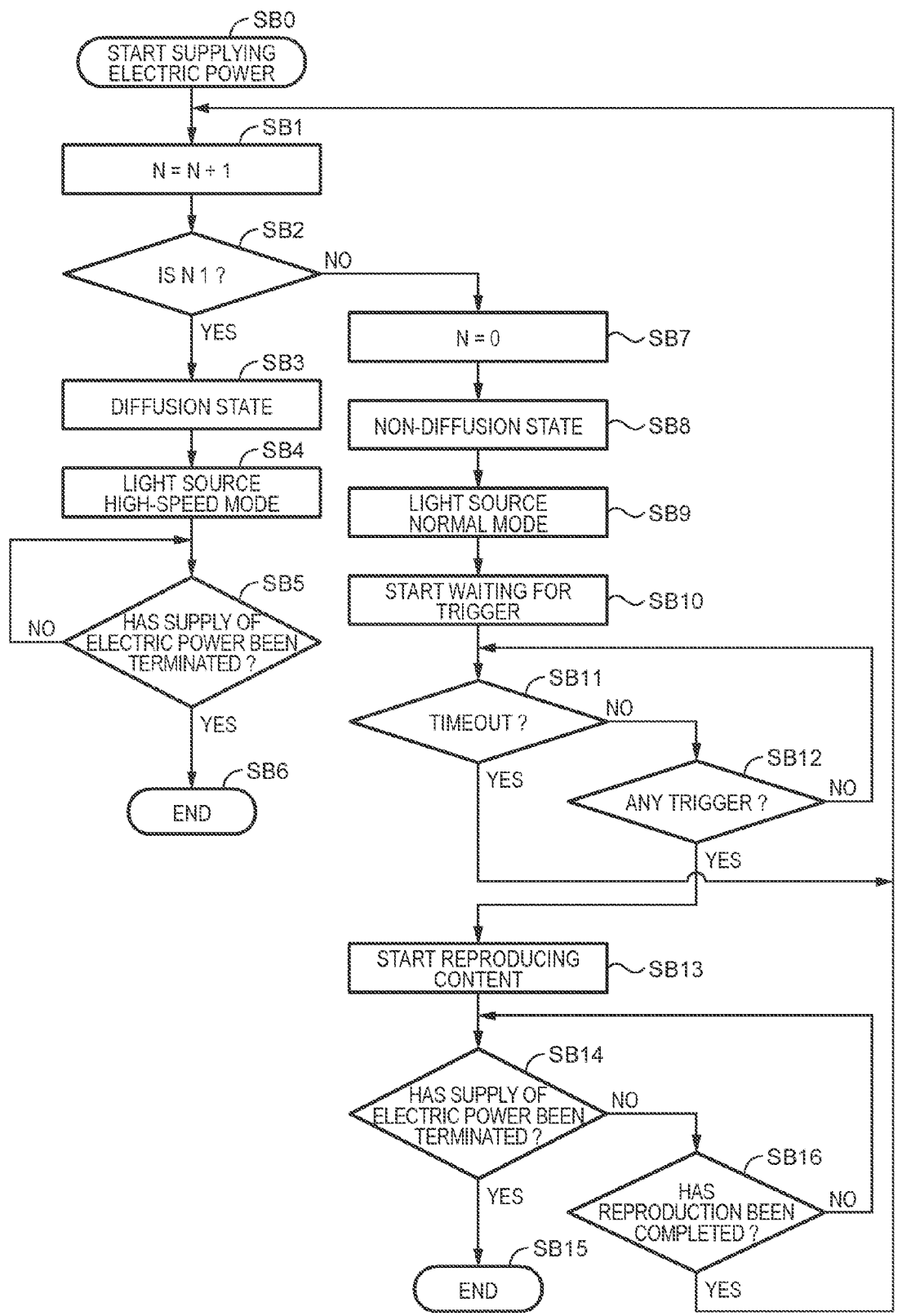
FIG. 7 is a flowchart showing the operation of a projector according to another embodiment.

In FIG. 7, steps SB0 to SB9 are basically the same as steps SA0 to SA9 shown in FIG. 6, respectively. In FIG. 7, steps SB13 to SB16 are also basically the same as steps SA10 to SA13 shown in FIG. 6, respectively.

As shown in FIG. 7, when the value of N is not "1" (SB2: NO), the projector 100 starts waiting for a command input or a content input (SB10). Specifically, the projector 100 starts waiting for a command input that instructs reproduction of a content stored in the flash drive, the memory card, or the nonvolatile memory in the projector 100 (internal content) or starts waiting for a content externally inputted to the projector 100 (external content). The command or the content serves as the "trigger" described above.

In the present embodiment, the "trigger" inputted to the projector 100 is received by the interface 11 (FIG. 5) described above. Examples of an aspect in which the interface 11 receives a command as the "trigger" include receiving an infrared command from the remote controller (not shown), receiving a command over an external network, and detecting operation of pressing a button (reproduction button, for example) on the enclosure of the projector 100. When the interface 11 receives a content as the "trigger," the content is received by the wireless LAN adaptor 12 accommodated in the interface 11. In this case, the wireless LAN adaptor 12 may, of course, be replaced with a PLC (power-line carrier communication) modem and a content may be received via the power receiving terminal 9.

After the projector 100 starts waiting for a trigger input in step SB10, it is determined in step SB11 whether or not a predetermined period has elapsed. The predetermined period is counted from the point of time when step SB10 starts. When the predetermined period has not elapsed (SB11: NO) and the interface 11 has received the trigger (SB12: YES), the display controller 4 starts reproducing the content (SB13). Steps SB14, SB15, and SB16 after the reproduction of the content starts are the same as steps SA11, SA12, and SA13 in the second embodiment (FIG. 6).

When the interface 11 has received no trigger and the predetermine period has elapsed (SB11: YES), the control proceeds to a point immediately before step SB1. At this point, since the value of N has been set at "0" in step SB7, the value of N becomes "1" in step SB1, and the control therefore proceeds via the YES route from step SB2 to steps SB3, SB4, and SB5. As a result, the function of the projector 100 changes from the function of image projection to the function of illumination projection.

In the configuration described above, when the projector 100 has received no trigger input within the predetermined period, the projector 100 starts performing the function as an illuminator. As a result, the present embodiment can provide a projector that provides excellent convenience.

As a variation of the present embodiment, unlike the first and second embodiments, the function of alternately specifying one of the illumination projection and the image projection every time electric power supply to the power receiving terminal 9 is started may be omitted. Even when the function is omitted, the advantageous effect described above is provided.

The projector 100 can, for example, be so configured that it projects a UI image for allowing the user to select which of a plurality of contents is reproduced. The projector 100 may also be so configured that when the trigger described above (selection of content, for example) has not been issued within the predetermined period (10 minutes, for example) since the projector 100 started projecting the UI image, the projector starts performing the function as an illuminator.

Further, the projector 100 can, for example, be so configured that after reproduction of one content is completed, the projector 100 projects a UI image for allowing the user to select which of the plurality of contents is reproduced next. The projector 100 may also be so configured that when the trigger described above (selection of content, for example) has not been issued within the predetermined period since the projector 100 started projecting the UI image, the projector starts performing the function as an illuminator. The variations described above can also provide a projector that provides excellent convenience.

Variation 1

The light diffuser 7 is not necessarily a PDLC device and may be a device using a diffuser plate, a device using a lens that adjusts focusing, or a combination of any of the three devices described above.

Figure 8A:
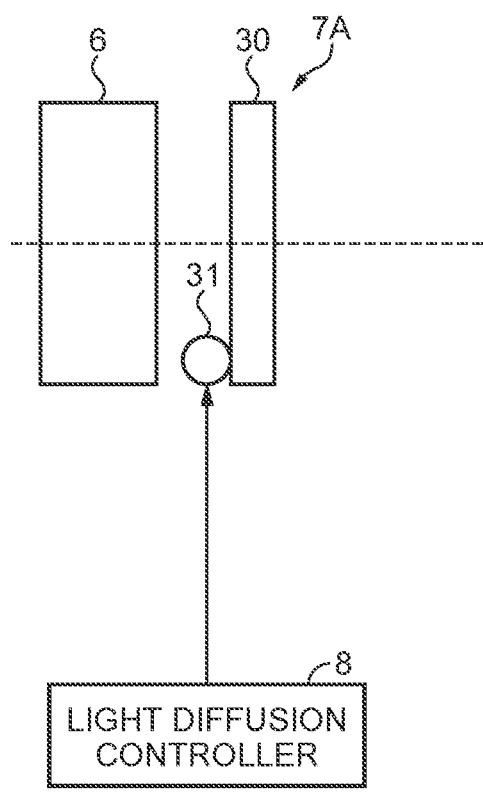
FIGS. 8A and 8B are schematic views showing a case where a light diffuser in any of the embodiments includes a diffuser plate.
Figure 8B:
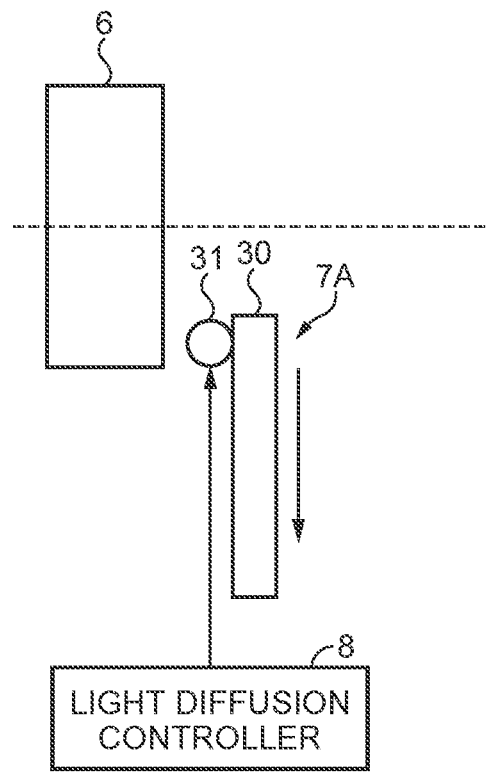

When a diffuser plate 30 is used, a light diffuser 7A includes the diffuser plate 30, which diffuses and transmits light, and a mechanical mechanism 31, which causes the diffuser plate 30 to slide so that it is inserted into the optical path of the projector 100 or removed therefrom, as shown in FIGS. 8A and 8B. The position where the diffuser plate 30 is inserted may be any position on the optical path, for example, a position on the optical path between the spatial light modulator 3 and the RGB light sources 1R, 1G, and 1B. The same holds true for the case where the reverse-mode PDLC device is used and the case where a PDLC device is used. That is, the light diffuser 7A may diffuse either the light incident on the spatial light modulator 3 or the light having exited out of the spatial light modulator 3. The light diffuser 7A is, however, preferably disposed downstream of a projection lens that is the outermost optical component because the light fluxes from the RGB light sources 1R, 1G, and 1B can be efficiently used in the illumination projection.

The diffuser plate 30 may have a wheel-like shape. In this case, the diffuser plate 30 may include a portion that diffuses light (portion where the degree of diffusion is high), a portion that transmits light without substantially diffusing the light (portion where the degree of diffusion is low), and a portion where the degree of diffusion is intermediate.

When the mechanism 31 rotates the wheel under the control of the light diffusion controller 8, one of the three portions described above is positioned in the optical path of the projector 100.

Figure 9:
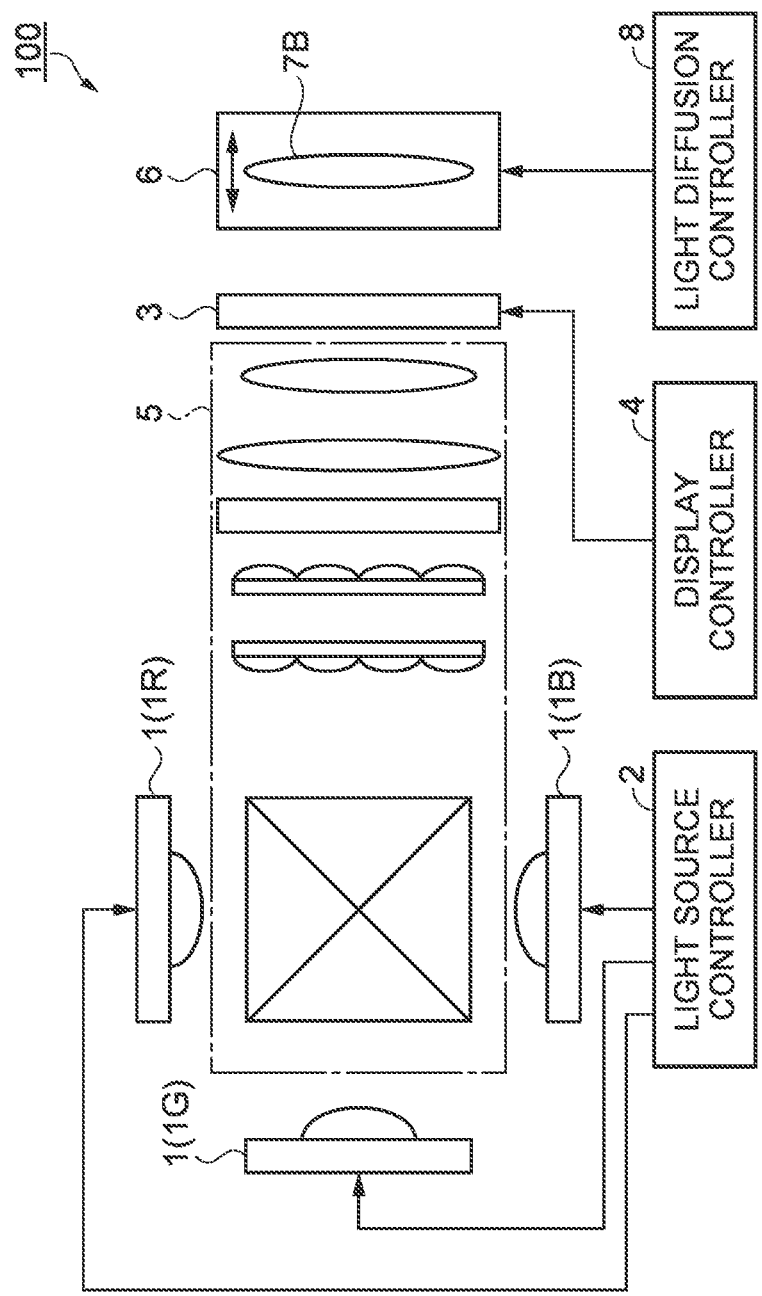
FIG. 9 is a schematic view showing a case where the light diffuser in any of the embodiments includes a focus adjustment lens.

When a lens that adjusts focusing (focus lens) is used, a light diffuser 7B includes the focus lens accommodated in the projection system 6 and a mechanism that changes the position of the focus lens along the optical path, as shown in FIG. 9.

In the illumination projection, the light diffusion controller 8 drives the light diffuser 7B in such a way that the projected light is not brought into focus on a projection surface (screen, wall, table top, or ceiling, for example). As a result, the light from the projector 100 is diffused on the projection surface.

In the image projection, the light diffusion controller 8 drives the light diffuser 7B in such a way that the projected light is brought into focus on the projection surface. As a result, the light from the projector 100 is not substantially diffused on the projection surface.

The light diffusion controller 8 may measure the distance between the projector 100 and the projection surface every time the image projection is initiated and make adjustment in such a way that the projected light is brought into focus, or the light diffusion controller 8 may not measure the distance every time but may store the position of the lens so adjusted that the projected light is brought into focus and control the focus lens in such a way that it is moved to the stored position in response to switching operation from the illumination projection to the image projection.

Variation 2

Transmission of a command to the projector 100 includes transmission of an infrared command from the remote controller, transmission of a command attached to an e-mail message, and transmission of a command from a dedicated application program that runs on a smartphone or a tablet computer. The latter two cases are effective when the projector 100 is connected to an external network via a wireless LAN or PLC (power-line carrier communication). Therefore, in addition to the remote controller, a personal computer, a mobile phone including a smartphone, and a tablet computer can also remotely control the projector 100.

Variation 3

According to any of the embodiments described above, the spatial light modulator 3 is a single-plate transmissive liquid crystal light valve. The spatial light modulator 3 can instead include a reflective liquid crystal light valve or a digital mirror device (DMD). When the spatial light modulator 3 includes a reflective liquid crystal light valve, a digital mirror device, or any other light valve, how to modify the irradiation system 5 and the projection system 6 is apparent to those skilled in the art.

Rendering Method Using Projector According to Embodiments

According to any of the embodiments described above, the light diffuser 7 can cyclically repeat transition between the diffusion state and the non-diffusion state. The cyclic repetition can provide attractive illumination rendering. In this process, the projector 100 projects an image for illumination projection when the light diffuser 7 diffuses light, whereas projecting an image for image projection when the light diffuser 7 does not substantially diffuse light. The projector 100 may instead project an image based on image data irrespective of the state of the light having passed through the light diffuser 7, that is, diffused or not diffused.

What is claimed is:

1. A projector comprising:
   a power receiving terminal;
   a light source that emits light based on electric power supplied to the power receiving terminal;
   a light diffuser that adjusts the degree of diffusion of the light from the light source;
   a specifying section that alternately specifies one of first projection and second projection every time electric power supply to the power receiving terminal is started; and
   a light diffusion controller that controls the light diffuser so that when the specifying section specifies the first projection, the light diffuser diffuses the light from the light source, whereas when the specifying section specifies the second projection, the light diffuser transmits the light without substantially diffusing the light,
   wherein the specifying section automatically defaults to the first and second projection mode in an alternating way when the power supply is started.

2. The projector according to claim 1,
   wherein the light diffuser includes a PDLC device.

3. The projector according to claim 1,
   wherein the light diffuser includes a focus adjustment lens.

4. A method for controlling a projector including
   a power receiving terminal,
   a light source that emits light based on electric power supplied to the power receiving terminal, and
   a light diffuser that adjusts the degree of diffusion of the light from the light source,
   the method comprising:
   a step A of alternately specifying one of first projection and second projection every time electric power supply to the power receiving terminal is started;
   a step B of causing the light diffuser to diffuse the light from the light source when the first projection is specified in the step A; and
   a step C of causing the light diffuser to transmit the light without substantially diffusing the light when the second projection is specified in the step A,
   wherein step A defaults to the first and second projection mode in an alternating way when the electric power supply is started.

5. A projector comprising:
   a power receiving terminal;
   a light source that emits light based on electric power supplied to the power receiving terminal;
   a light diffuser that adjusts the degree of diffusion of light from the light source;
   a display controller that reproduces content;
   a spatial light modulator that modulates the light from the light source in accordance with the reproduction of the content;
   a specifying section that alternately specifies one of a first projection, in which the light diffuser diffuses the light from the light source, and a second projection, in which the light diffuser transmits the light from the light source without substantially diffusing the light, every time electric power supply to the power receiving terminal is started; and
   a light diffusion controller that controls the light diffuser so that when the display controller reproduces the content, the light diffuser transmits the light from the light source without substantially diffusing the light, wherein the light diffusion controller controls the light diffuser so that when the reproduction of content is completed, the light diffuser diffuses the light from the light source, and wherein the specifying section automatically defaults to the first and second projection mode in an alternating way when the power supply is started.

6. The projector according to claim 5,
wherein the light diffuser includes a PDLC device.

7. The projector according to claim 5,
wherein the light diffuser includes a focus adjustment lens.

8. A method for controlling a projector including a power receiving terminal;
a light source that emits light based on electric power supplied to the power receiving terminal,
a light diffuser that adjusts the degree of diffusion of light from the light source,
a display controller that reproduces content,
a specifying section that alternately specifies one of first projection, in which the light diffuser diffuses the light from the light source, and second projection, in which the light diffuser transmits the light from the light source without substantially diffusing the light, every time electric power supply to the power receiving terminal is started, and
a spatial light modulator that modulates the light from the light source in accordance with the reproduction of the content,
the method comprising:
a step A of causing the display controller to reproduce the content;
a step B of controlling the light diffuser so that when the display controller reproduces the content, the light diffuser transmits the light from the light source without substantially diffusing the light; and
a step C of controlling the light diffuser so that when the reproduction of the content is completed, the light diffuser diffuses the light from the light source,
wherein the specifying section automatically defaults to the first and second projection mode in an alternating way when the electric power supply is started.

9. A projector comprising:
a power receiving terminal;
a light source that emits light based on electric power supplied to the power receiving terminal;
a light diffuser that adjusts the degree of diffusion of light from the light source;
an interface that receives a predetermined trigger;
a display controller that reproduces a content when the interface has received the trigger within a predetermined period since the interface started waiting for the trigger;
a specifying section that alternately specifies one of first projection, in which the light diffuser diffuses the light from the light source, and second projection, in which the light diffuser transmits the light from the light source without substantially diffusing the light, every time electric power supply to the power receiving terminal is started;
a spatial light modulator that modulates the light from the light source in accordance with the reproduction of the content; and
a light diffusion controller that controls the light diffuser so that when the display controller reproduces the content, the light diffuser transmits the light from the light source without substantially diffusing the light,
wherein the light diffusion controller controls the light diffuser so that when the interface has not received the trigger within the predetermined period, the light diffuser diffuses the light from the light source, and
wherein the specifying section automatically defaults to the first and second projection mode in an alternating way when the electric power supply is started.

10. The projector according to claim 9,
wherein the trigger is a command that instructs reproduction of the content.

11. The projector according to claim 9,
wherein the trigger is the content to be reproduced.

12. The projector according to claim 9,
wherein the light diffuser includes a PDLC device.

13. The projector according to claim 9,
wherein the light diffuser includes a focus adjustment lens.

14. A method for controlling a projector including
a power receiving terminal;
a light source that emits light based on electric power supplied to the power receiving terminal,
a light diffuser that adjusts the degree of diffusion of light from the light source,
an interface that receives a predetermined trigger,
a display controller that reproduces content,
in accordance with the reproduction of the content,
a specifying section that alternately specifies one of first projection, in which the light diffuser diffuses the light from the light source, and second projection, in which the light diffuser transmits the light from the light source without substantially diffusing the light, every time electric power supply to the power receiving terminal is started, and
a spatial light modulator that modulates the light from the light source in accordance with the reproduction of the content,
the method comprising:
a step A of causing the interface to start waiting for the trigger;
a step B of causing the display controller to reproduce the content when the interface has received the trigger within a predetermined period of time since the interface started waiting for the trigger;
a step C of controlling the light diffuser so that when the display controller reproduces the content, the light diffuser transmits the light from the light source without substantially diffusing the light; and
a step D of controlling the light diffuser so that when the interface has not received the trigger within the predetermined period, the light diffuser diffuses the light from the light source,
wherein the specifying section automatically defaults to the first and second projection mode in an alternating way when the power supply is started.

* * * * *